United States Patent
Webber et al.

(10) Patent No.: US 10,462,240 B2
(45) Date of Patent: Oct. 29, 2019

(54) REFERRAL SOURCE TRACKING

(71) Applicant: FX Compared US LLC, New York, NY (US)

(72) Inventors: Daniel Webber, New York, NY (US); Yuval Mesika, Netanya (IL)

(73) Assignee: FX COMPARED US LLC, New York, NY (US)

( * ) Notice: Subject to any disclaimer, the term of this patent is extended or adjusted under 35 U.S.C. 154(b) by 450 days.

(21) Appl. No.: 15/242,287

(22) Filed: Aug. 19, 2016

(65) Prior Publication Data

US 2017/0054820 A1    Feb. 23, 2017

Related U.S. Application Data

(60) Provisional application No. 62/207,179, filed on Aug. 19, 2015.

(51) Int. Cl.
| | |
|---|---|
| *H04L 29/08* | (2006.01) |
| *G06Q 30/06* | (2012.01) |
| *G06Q 30/02* | (2012.01) |

(52) U.S. Cl.
CPC .......... *H04L 67/22* (2013.01); *G06Q 30/0214* (2013.01); *G06Q 30/0601* (2013.01);
(Continued)

(58) Field of Classification Search
CPC ........... G06Q 30/0214; G06Q 30/0601; G06Q 30/0603; G06Q 30/0613; G06Q 30/02;
(Continued)

(56) References Cited

U.S. PATENT DOCUMENTS 5,712,979 A *   1/1998   Graber .................. G06F 16/955
                                                                                                            709/224

5,991,740 A     11/1999   Messer
(Continued)

FOREIGN PATENT DOCUMENTS

| WO | 2001/075628 A1 | 10/2001 |
|---|---|---|
| WO | 2006/130578 A2 | 12/2006 |

OTHER PUBLICATIONS

T. Kwok and Thao Nguyen, "A novel Web sales tracking solution for multi-channel marketing programs on electronic commerce," Proceedings. IEEE International Conference on e-Commerce Technology, 2004. CEC 2004., San Diego, CA, USA, 2004, pp. 362-365. (Year: 2004).*

(Continued)

*Primary Examiner* — Vivek Srivastava
*Assistant Examiner* — William C McBeth
(74) *Attorney, Agent, or Firm* — Dorsey & Whitney LLP

(57) ABSTRACT

A hub system, including a memory containing instructions that cause a processor to host a website, interact with a user via the website, select providers, including a first provider associated with a first URI and a second provider associated with a second URI, and based on determining the user is associated with a referral source, modify the first and second URIs. Modifying includes: determining, based on the first URI, a first modification, modifying the first URI according to the first modification to create a modified first URI containing a first identifier, determining, based on the second URI, a second modification, and modifying the second URI according to the second medication to create a modified second URI containing a second identifier. The instructions cause a user interface to display a hyperlink associated with the modified first URI so the user is directed to a provider system upon selecting the hyperlink.

24 Claims, 11 Drawing Sheets

(52) U.S. Cl.
CPC ......... *G06Q 30/0613* (2013.01); *H04L 67/02* (2013.01); *G06Q 30/0641* (2013.01)

(58) Field of Classification Search
CPC .... G06Q 30/06; G06Q 30/0641; H04L 67/02; H04L 67/22; H04L 67/28; H04L 67/2814
See application file for complete search history.

(56) References Cited

U.S. PATENT DOCUMENTS

| | | | |
|---|---|---|---|
| 6,016,504 A | 1/2000 | Arnold et al. | |
| 6,029,141 A * | 2/2000 | Bezos | G06Q 30/0214 |
| | | | 705/26.41 |
| 8,150,979 B1 * | 4/2012 | Oldham | G06F 16/9566 |
| | | | 709/228 |
| 2002/0082960 A1 * | 6/2002 | Goedken | G06Q 30/02 |
| | | | 705/35 |
| 2002/0111856 A1 * | 8/2002 | Messer | G06Q 30/0214 |
| | | | 705/14.16 |
| 2004/0267610 A1 * | 12/2004 | Gossett | G06Q 30/0214 |
| | | | 705/14.16 |
| 2006/0287950 A1 | 12/2006 | Steinberg et al. | |
| 2007/0260605 A1 * | 11/2007 | Norman | G06Q 30/02 |
| 2008/0281754 A1 * | 11/2008 | Kelley | G06Q 30/02 |
| | | | 705/39 |
| 2009/0171808 A1 * | 7/2009 | Tracey | G06Q 30/0601 |
| | | | 705/26.1 |
| 2009/0271497 A1 * | 10/2009 | Roberts | G06Q 30/02 |
| | | | 709/218 |
| 2009/0282052 A1 * | 11/2009 | Evans | G06F 16/9566 |
| 2010/0318434 A1 | 12/2010 | Messer | |
| 2011/0239103 A1 * | 9/2011 | Mercuri | G06Q 30/0241 |
| | | | 715/234 |
| 2013/0073388 A1 | 3/2013 | Heath | |
| 2013/0173367 A1 * | 7/2013 | Beighley, Jr. | G06Q 30/0214 |
| | | | 705/14.16 |
| 2014/0052514 A1 * | 2/2014 | Beighley, Jr. | G06Q 30/0214 |
| | | | 705/14.16 |
| 2015/0033152 A1 | 1/2015 | Shuster et al. | |
| 2016/0350780 A1 * | 12/2016 | G | G06Q 30/0214 |
| 2018/0013801 A1 * | 1/2018 | Lewis | G06Q 50/00 |

OTHER PUBLICATIONS

International Search Report and Written Opinion, PCT Application PCT/US2016/047865 dated Oct. 27, 2016, 15 Pages.

* cited by examiner

Affiliate Partners  ⊕ Add New

Affiliate

Total: 12

| Name | Organization | URL Params | Source | Sub Group | Actions |
|---|---|---|---|---|---|
| Provider 1 Default | Provider 1 | F0001 | | | ⊙✎ |
| Provider 1 Sourceone | Provider 1 | F0002 | Sourceone | | ⊙✎ |
| Provider 1 Sourcetwo | Provider 1 | F0003 | Sourcetwo | | ⊙✎ |
| Provider 2 Default | Provider 2 | A02550 | | | ⊙✎ |
| Provider 2 Sourceone | Provider 2 | A02550-01 | Sourceone | | ⊙✎ |
| Provider 2 Sourcethree | Provider 2 | A02550-02 | Sourcethree | | ⊙✎ |
| Provider 3 Sourcethree | Provider 3 | F567G90 | Sourcethree | | ⊙✎ |
| Provider 4 Default | Provider 4 | 645665 | | | ⊙✎ |
| Provider 5 Default | Provider 5 | 7G900 | | | ⊙✎ |
| Provider 6 Default | Provider 6 | 6001 | | | ⊙✎ |
| Provider 6 Sourcetwo | Provider 6 | 7345 | Sourcetwo | | ⊙✎ |
| Provider 6 Sourcethree | Provider 6 | 7346 | Sourcethree | | ⊙ |

Save Edits   Clear Unsaved

- Dashboard
- Affiliates
  - Affiliates
  - Add Affiliates
  - Edit Affiliates
  - Affiliate Partners
- Organizations

FIG. 7

Edit TorFX Newspaper

Affiliates / Edit Affiliate

Name: Provider 1 Sourceone          Organization
                                     Provider 1

URL Params
F0002

Source                               Sub Group
Sourceone

[Save Edits]    [Clear Unsaved]

- Dashboard
- Affiliates
  - Affiliates
  - Add Affiliates
  - Edit Affiliates
- Affiliate Partners

FIG.8

| Dashboard | | | |
|---|---|---|---|
| Affiliates | Affiliate Partners ⊙ Add New | | |
| Affiliate Partners | affiliate-partners | | |
| Affiliate Partners | | | |
| Add Affiliate | Total: 5 | | |
| Edit Affiliate Partners | ID | Image | Actions |
| | Sourceone | | ✎ |
| | Sourcetwo | http://image... | ✎ |
| | Sourcethree | | ✎ |
| | Sourcefour | http://image... | ✎ |
| | Source n | | ✎ |
| | Save Edits | Clear Unsaved | |

FIG.9

WE ARE PLEASED TO INTRODUCE THE
FOLLOWING LEAD TO YOU:

| | |
|---:|:---|
| Name | Test Lead |
| Phone | 44100200300 |
| Email | test1234@testlead.com |
| Currency Buy | CAD |
| Currency Sell | GBP |
| Amount | 10,000 |
| Sub Group | *|SUBGROUP|* |

THANK YOU,
SINCERELY,

FIG.10

| Affiliate | ○ Add New | | | | | | |
|---|---|---|---|---|---|---|---|
| Affiliate Total: 200 | | | | | | | |
| Name | Organization Type | Organization | URL Params | Source | Sub Group | Actions | |
| Provider 1 Default | Money transfer provider | Provider 1 | F0001 | | Default | ✎🗑 | |
| Provider 1 Default | Money transfer provider | | F0002 | | Default | ✎🗑 | |
| Provider 1 Default | Money transfer provider | | F0003 | | Default | ✎🗑 | |
| Provider 2 Sourceone | Money transfer provider | Provider 2 | A0250 | Sourceone | | ✎🗑 | |
| Provider 2 Default | Money transfer provider | | A0351 | | Default | ✎🗑 | |
| Provider 3 Sourcetwo | Money transfer provider | Provider 3 | F4668 | Sourcetwo | | ✎🗑 | |
| Provider 3 Sourceone | Money transfer provider | | F9767 | Sourceone | | ✎🗑 | |
| Provider4 Sourceone | Money transfer provider | Provider 4 | A2673 | Sourceone | | ✎🗑 | |
| Provider4 Sourcetwo | Money transfer provider | | A4567 | Sourcetwo | | ✎🗑 | |
| Provider4 Sourceone | Money transfer provider | | A6789 | Sourceone | | ✎🗑 | |
| Provider5 Sourceone | Money transfer provider | Provider 5 | F9876 | Sourceone | | ✎🗑 | |
| Provider5 Sourcetwo | Money transfer provider | | F0987 | Sourcetwo | | ✎🗑 | |
| Provider5 Default | Money transfer provider | | F6789 | | Default | ✎🗑 | |

FIG. 12

REFERRAL SOURCE TRACKING

CROSS-REFERENCE TO RELATED APPLICATIONS

This application claims the benefit of priority pursuant to 35 U.S.C. § 119(e) of U.S. provisional patent application No. 62/207,179, filed 19 Aug. 2015, entitled "Referral Source Tracking," which is hereby incorporated by reference herein in its entirety.

FIELD

The present invention relates to methods for modifying uniform resource identifiers to track referral sources on the internet.

BACKGROUND

A central hub system can host a website that directs users to multiple providers, for example, to allow the users to compare rates. For example, a website hosted by a central hub may show a comparison of providers' money transfer rates and contain web links to the provider systems. Thus, a user can choose a provider with a desirable transfer rate (e.g., the lowest rate) and then select a hyperlink on the webpage for the provider. By selecting the hyperlink, the central hub system may direct a user to the selected provider system, and the can then engage in online transactions with the provider system. The user can exchange currency with the provider and pay the provider a fee for carrying out the exchange. The provider can give the central hub a share of the fee, in exchange for the central hub directing the user to the provider. Sometimes, a referral source directs a user to the central hub system's website. In such cases, the provider of the referral source and the provider of the central hub system share the fee given to the central hub provider by the provider. Needed is a way to track internet traffic in order to determine which users go to the central hub system directly and which users go to the central hub system via a referral source, for example, in order to allocate revenue by referral source.

The users can transact with the provider systems through the website, via the network. In some instances, a referral source can lead the users to the central hub, which can then lead the users to the providers. In other instances, the users can go to the central hub, without a referral source leading them thereto, and the central hub can lead the users to the provider systems, without a referral source being involved in the communication flow. The referral source tracking system 100 enables the central hub 102 to track whether a user was lead to a provider system by both the central hub and a referral source (and to identify the particular referral source), or whether the user was lead to the provider system by the central hub without a referral source. The referral source tracking system 100 can facilitate cost-sharing and other arrangements among the operators of the referral sources, operators of the central hub, and the providers.

SUMMARY

In some embodiments, disclosed is a hub system for tracking referral source internet traffic. The hub system comprises a processor and a memory. The memory contains computer readable instructions that, when executed by the processor, cause the processor to host a website, interact with a first user via the website, select a plurality of providers, including a first provider associated with a first uniform resource identifier (URI) and a second provider associated with a second URI, based on determining that the first user is associated with a first referral source of a plurality of selected sources, modify the first and second URIs. The modifying comprises determining, based on the first URI, a first type of modification, modifying the first URI to create a modified first URI, so that the modified first URI contains a first identifier, determining, based on the second URI, a second type of modification, and modifying the second URI according to the second type of medication to create a modified second URI, so that the modified second URI contains a second identifier. The instructions also cause the processor to cause a first hyperlink to be displayed on at least one first user interface, the first hyperlink being associated with the modified first URI so that the first user is directed to a first provider system associated with the first provider upon the first user selecting the first hyperlink that is associated with the modified first URI.

In some embodiments, disclosed is a method for tracking internet traffic referral sources. The method comprises hosting, by a hub system, a website; interacting with a first user via the website; and selecting a plurality of providers. The plurality of providers includes a first provider associated with a first uniform resource identifier (URI) and a second provider associated with a second URI. The method also comprises, based on determining that the first user is associated with a first referral source of a plurality of selected sources, modifying the first and second URIs. The modifying includes determining, based on the first URI, a first type of modification; modifying the first URI according to a first modification to create a modified first URI, so that the modified first URI contains a first identifier; determining, based on the second URI, a second type of modification, and modifying the second URI according to the second type of medication to create a modified second URI, so that the modified second URI contains a second identifier. The method also includes causing a first hyperlink to be displayed on at least one first user interface, the first hyperlink being associated with the modified first URI so that the first user is directed to a first provider system upon the first user selecting the first hyperlink that is associated with the modified first URI.

In some embodiments, disclosed is a hub system for tracking referral source internet traffic. The hub system includes a processor and a memory. The memory contains computer readable instructions that, when executed by the processor, cause the processor to cause a first hyperlink to be displayed on at least one user interface, the first hyperlink being associated with a modified first URI, the modified first URI being modified based on an association between the user and a referral source, so that a user is directed to a first provider system associated with a first provider upon the user selecting the first hyperlink; modify a second URI that is associated with a second provider according to another type of modification to create a modified second URI, so that the modified second URI contains an identifier; and cause a second hyperlink to be displayed on the at least one interface, the second hyperlink being associated with the modified second URI so that the user is directed to the second provider system upon the first user selecting the modified second URI. The identifier is usable by the second provider system to compile user data associating both the referral source and the first provider with transactions between the first user and the second provider.

BRIEF DESCRIPTION OF THE DRAWINGS

FIG. 7 shows an exemplary look-up table for affiliate codes linking a referral source to a url that leads to a provider.

FIG. 8 is a schematic representation of screenshot presented to a user of a central hub system for modifying the table of FIG. 7;

FIG. 9 is a schematic representation of screenshot presented to a user of a central hub system for modifying the table of FIG. 7;

FIG. 10 is a screenshot showing how a provider system can receive a lead to a user system via an email from the central hub system that associates the user with a referral source;

FIG. 12 shows an exemplary look-up table for affiliate codes linking a referral source to a url that leads to a provider.

DETAILED DESCRIPTION

Figure 1:
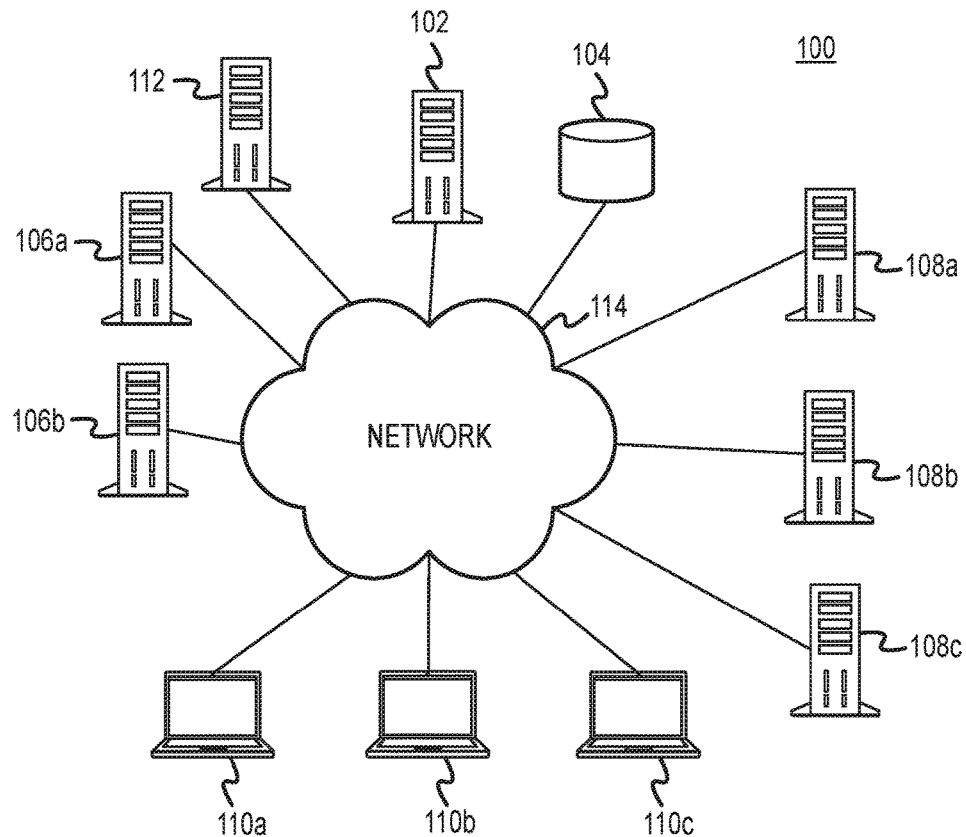
FIG. 1 is a diagram of a system for referral source tracking.

Turning to the figures, a system for tracking a referral source will now be discussed. FIG. 1 is a referral source tracking system 100 for allowing a central hub 102 to monitor users (e.g., 110a, 110b, 110c) that it leads over the network to provider systems 108, when the central hub 102 works with referral sources 106 to acquire users 108. Users can communicate with the central hub (e.g., can go onto a website hosted by the central hub) in order to be brought to provider systems (e.g., to go onto a website hosted by providers). The users can transact with the provider systems through the website, via the network. In some instances, a referral source can lead the users to the central hub, which can then lead the users to the providers. In other instances, the users can go to the central hub, without a referral source leading them thereto, and the central hub can lead the users to the provider systems, without a referral source being involved in the communication flow. The referral source tracking system 100 enables the central hub 102 to track whether a user was lead to a provider system by both the central hub and a referral source (and to identify the particular referral source), or whether the user was lead to the provider system by the central hub without a referral source. Thus, the referral source tracking system 100 can facilitate cost-sharing and other arrangements among the operators of the referral sources, operators of the central hub, and the providers.

As one illustrative example, the central hub may be a web platform and portal that provides users with a comparison of a plurality of money transfer providers and directs the users to the provider systems. In other examples, the central hub may be a web platform and portal that provides users with a comparison of a plurality of airline ticket providers and directs the users to those provider systems. In other examples, the central hub may be a web platform and portal that provides users with a comparison of a plurality of car sales providers and directs the users to the provider systems.

While the following discussion will describe comparison of a plurality of money transfer providers, other applications are envisioned. The website hosted by the central hub may show a comparison of the providers' money transfer rates and contain web links to the provider systems. Thus, a user can choose a provider with a desirable transfer rate (e.g., the lowest rate) and then select a hyperlink on the webpage for the provider. By selecting the hyperlink, the central hub may cause the user's system 110 to communicate over the network 114 with the provider system 108 that is associated with the provider. The user can then use the user system 110 to engage in online transactions with the provider system 108 over the network 114. The user can exchange currency with the provider and pay the provider a fee for carrying out the exchange. The provider can give the central hub a share of the fee, in exchange for the central hub directing the user to the provider.

As explained above, in some circumstances, the users are brought to the central hub system 102 from a referral source. For example, a user device 110 can interact with a website that is hosted by a referral source. The referral source's website may present content (e.g., a widget, an article, etc.) to a graphical user interface 214 on the user device 110 that gives the user an option to be directed to the central hub's website (e.g., webpage contains a hyperlink, which a user can clink on to be directed to the central hub), or the referral source's website may automatically direct a user to the central hub's website. When users are directed to the provider through both the central hub system and the referral source and the provider gives the central hub a share of the fee, then the fee can be split between the central hub provider and the referral source provider. The referral source tracking system 100 provides a way to track internet traffic in order to implement such fee sharing arrangements. For example, when user devices 110 are lead from the central hub system 102 to a referral source system 106, the referral system tracking system 100 tracks which of the user devices 110 are lead to the central hub system 102 via a referral source system 106, and which of the user devices 110 to onto the central hub system 102 without being directed there from a referral source system 106.

Figure 2:
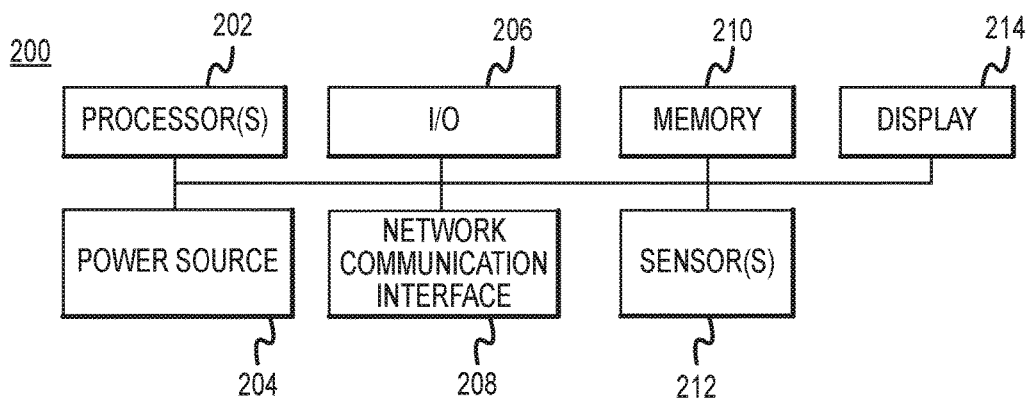
FIG. 2 is a simplified block diagram of a computing device that may be used with the system of FIG. 1.

FIG. 2 is a simplified block diagram of a computing device 200, such as a referral device, hub device, user device, and/or provider device, which may be used with the system of FIG. 1. Device 200 need not include all of the components shown in FIG. 2 and described below. For example, for a computing device 200 that is a referral device 106, a central hub device 102, or a provider device 108, one or more of the device 200 need not include an interface 206, display 214, or sensors 212.

The computing device 200 may include one or more processing elements 202, an input/output interface 206, one or more memory components 210, a display 214, a power source 204, a networking/communication interface 208, and/or one or more sensors 212 in communication with each other via one or more systems busses or via wireless transmission means, each of the components will be discussed in turn below.

The one or more processing elements may be substantially any electronic device capable of processing, receiving, and/or transmitting instructions. For example, the processing element may be a microprocessor or a microcomputer. Additionally, it should be noted that the processing element may include more than one processing member. For example, a first processing element may control a first set of components of the computing device and a second processing element may control a second set of components of the computing device, where the first and second processing elements may or may not be in communication with each other, e.g., a graphics processor and a central processing unit which may be used to execute instructions in parallel and/or sequentially.

The input/output interface allows the computing device to receive inputs from a user and provide output to the user. For example, the input/output interface may include a capacitive touch screen, keyboard, mouse, camera, stylus, or the like. The type of devices that interact via the input/output interface may be varied as desired. Additionally, the input/output interface may be varied based on the type of computing device used. Other computing devices may include similar sensors and other input/output devices.

The memory stores electronic data that may be utilized by the computing device. For example, the memory may store electrical data or content, for example audio files, video files, document files, and so on, corresponding to various applications. The memory may be, for example, non-volatile storage, a magnetic storage medium, optical storage medium, magneto-optical storage medium, read only memory, random access memory, erasable programmable memory, flash memory, or a combination of one or more types of memory components.

The display may be separate from or integrated with the computing device. For example, for cases in which the computing device is a smart phone or tablet computer, the display may be integrated with the computing device and in instances where the computing device is a server or a desktop computer the display may be separate from the computing device. The display provides a visual output for the computing device and may output one or more graphical user interfaces (GUIs). The display may be a liquid display screen, plasma screen, light emitting diode screen, and so on. The display may also function as an input device in addition to displaying output from the computing device. For example, the display may include capacitive touch sensors, infrared touch sensors, or the like that may capture a user's input to the display.

The power source provides power to the various components of the computing device. The power source may include one or more rechargeable, disposable, or hardwire sources, e.g., batteries, power cord, or the like. Additionally, the power source may include one or more types of connectors or components that provide different types of power to the computing device. The types and numbers of power sources may be varied based on the type of computing devices.

The networking/communication interface receives and transmits data to and from the computing device. The networking/communication interface may transmit and send data to the network, other computing devices, or the like. For example, the networking/communication interface may transmit data to and from other computing devices through the network which may be a wireless network (Wi-Fi, Bluetooth, cellular network, etc.) or a wired network (Ethernet), or a combination thereof. In particular, the network may be substantially any type of communication pathway between two or more computing devices. For example, the network may be wireless, wired, or a combination thereof. Some examples of the network include cellular data, Wi-Fi, Ethernet, Internet, Bluetooth, closed-loop network, and so on. The type of network 114 may include combinations of networking types and may be varied as desired.

The sensors may provide substantially any type of input to the computing device 200. For example, the sensors may be one or more accelerometers, microphones, global positioning sensors, gyroscopes, light sensors, image sensors (such as cameras), force sensors, and so on. The type, number, and location of the sensors 212 may be varied as desired and may depend on the desired functions of the system.

As will be discussed below, the computing device 102 and the network 108 may be used to perform one or more operations of the method to allow the purchase and transmission of tiered content.

Referring to FIGS. 1 and 2, the central hub system 102 includes one or more processors 202 that are communicatively coupled to at least one memory 210. The memory contains computer readable instructions that, when executed by the one or more processors, cause the one or more processors to perform a set of steps, some of the details of which will be explained in further detail below. The central hub system 102 includes at least one database for storing look-up tables, affiliate codes, and rules for modifying urls depending on particular providers, the details of which will be described below. At least one database may be stored in a local memory 210 and/or in a remote memory 104 communicatively coupled to the central hub system 102 via network 114. For example, the system 100 may include a remote database 104 that is a cloud-based database 104. In some embodiments, however, the database is stored in a local memory 210 associated with the central hub system 102 and is not a remote database.

Figure 3:
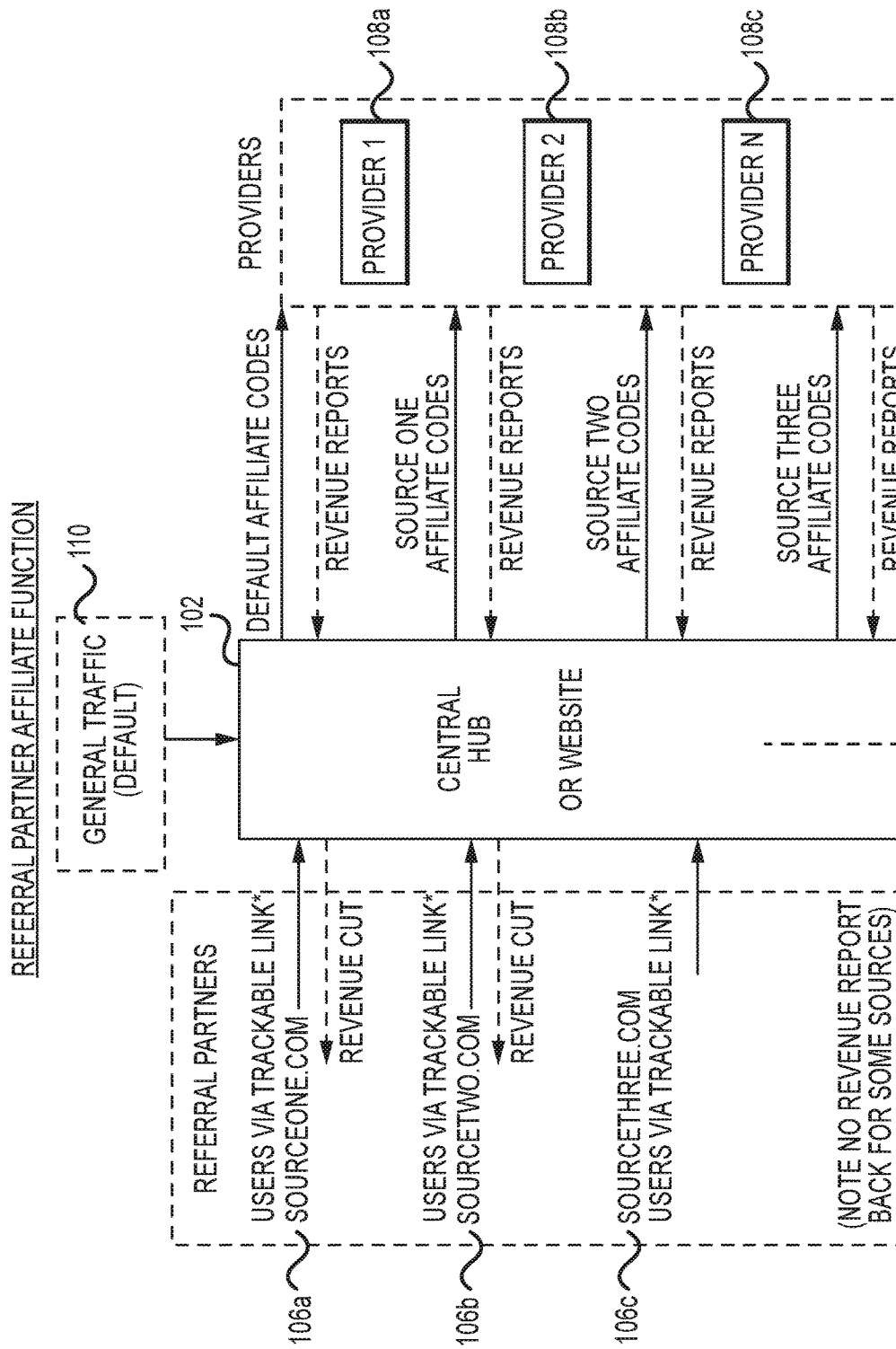
FIG. 3 is a schematic representation of a system for tracking referral source.
Figure 4:
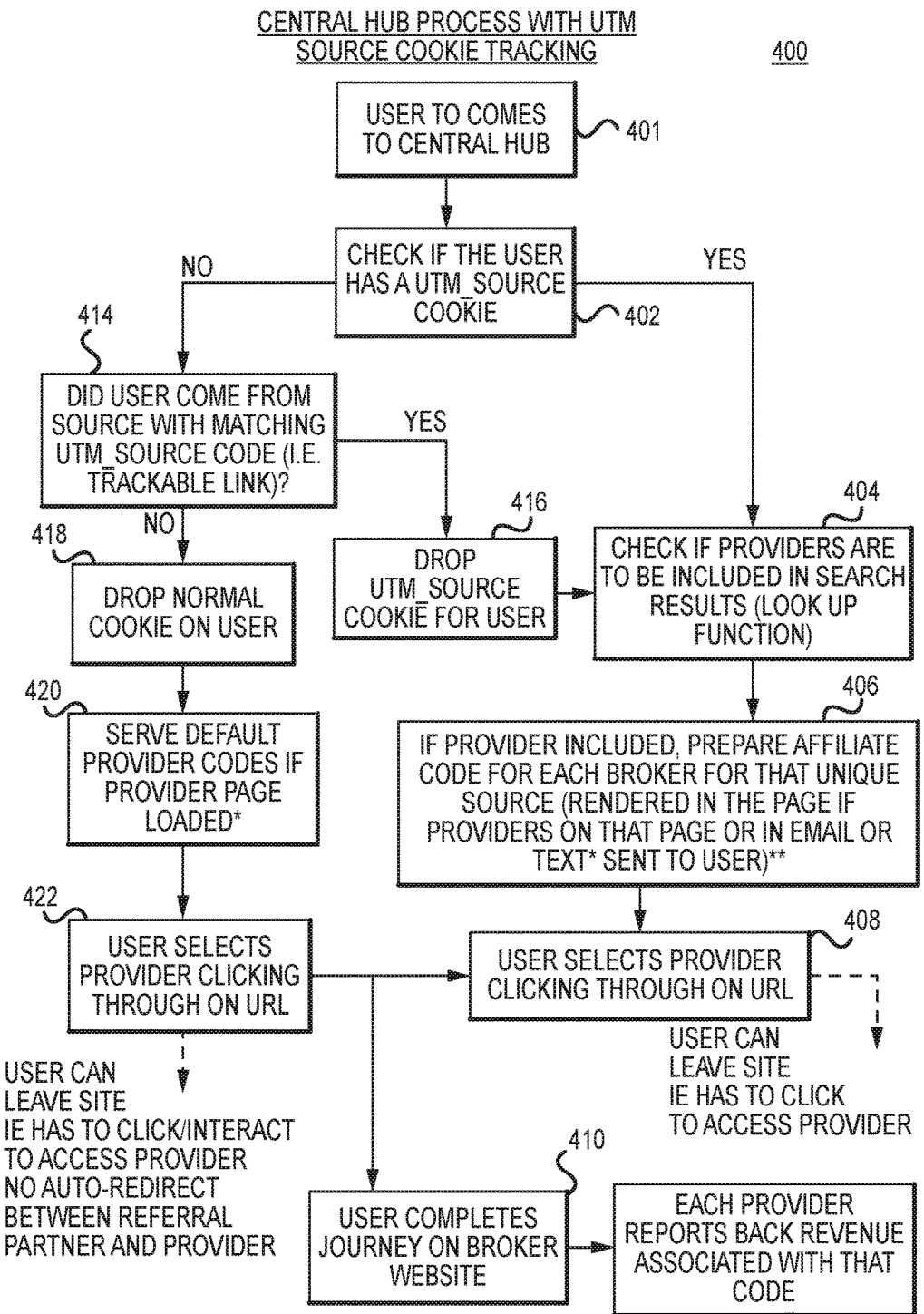
FIG. 4 is a flowchart for a method of tracking a referral source.

FIG. 3 is a schematic representation of a system for tracking referral source. FIG. 4 is a flowchart for a method 400 of tracking referral source. As shown, in step 401 a user interacts with the central hub website that is hosted by the central hub system 102. In some embodiments, the system 100 employs cookies. For example, in some embodiments the central hub system 102 may be able to identify users 110 that have interacted with a referral source 106 within a predetermined period of time. For example, the central hub system 102 can be able to detect when a user has been referred to the central hub by a referral source within 30 days. Thus, the central hub system 102 may be able to detect a cookie that associates the user device 110 to the referral source 106, and the cookie may last for a predetermined period of time (e.g., 30 days). If in step 402 the central hub system 102 detects the cookie, then the computer readable instructions may in step 404 cause the processor of central hub system 102 to determine whether providers are to be included in a list of a plurality of providers that is generated for a user. The central hub 102 may identify the plurality of providers that are to be included in the list via a look up function (e.g., retrieving information from database). The list of providers can be different for each referral source as controlled by the central hub 102. The central hub system 102 can select the list of providers by selecting a list of URIs. The central hub 102 may use look-up tables stored in database to identify the plurality of providers, based on a particular referral source. Additionally or alternatively, the list of providers can be different depending on the user. For example, the central hub 102 may determine a list of providers based on attributes associated with the user (e.g., which one or more languages the user speaks). The central hub system 102 may determine which providers to exclude in the list of providers. For example, a particular provider system can communicate to the central hub system 102 and transmit information to the central hub system 102 indicating that the provider cannot transact with a user due to a conflict of interest. The central hub 102 can use such information to exclude the provider from future lists of providers for the user. The central hub system 102 may use look-up tables stored in database to identify the plurality of providers, based on a particular referral source.

Figure 5:
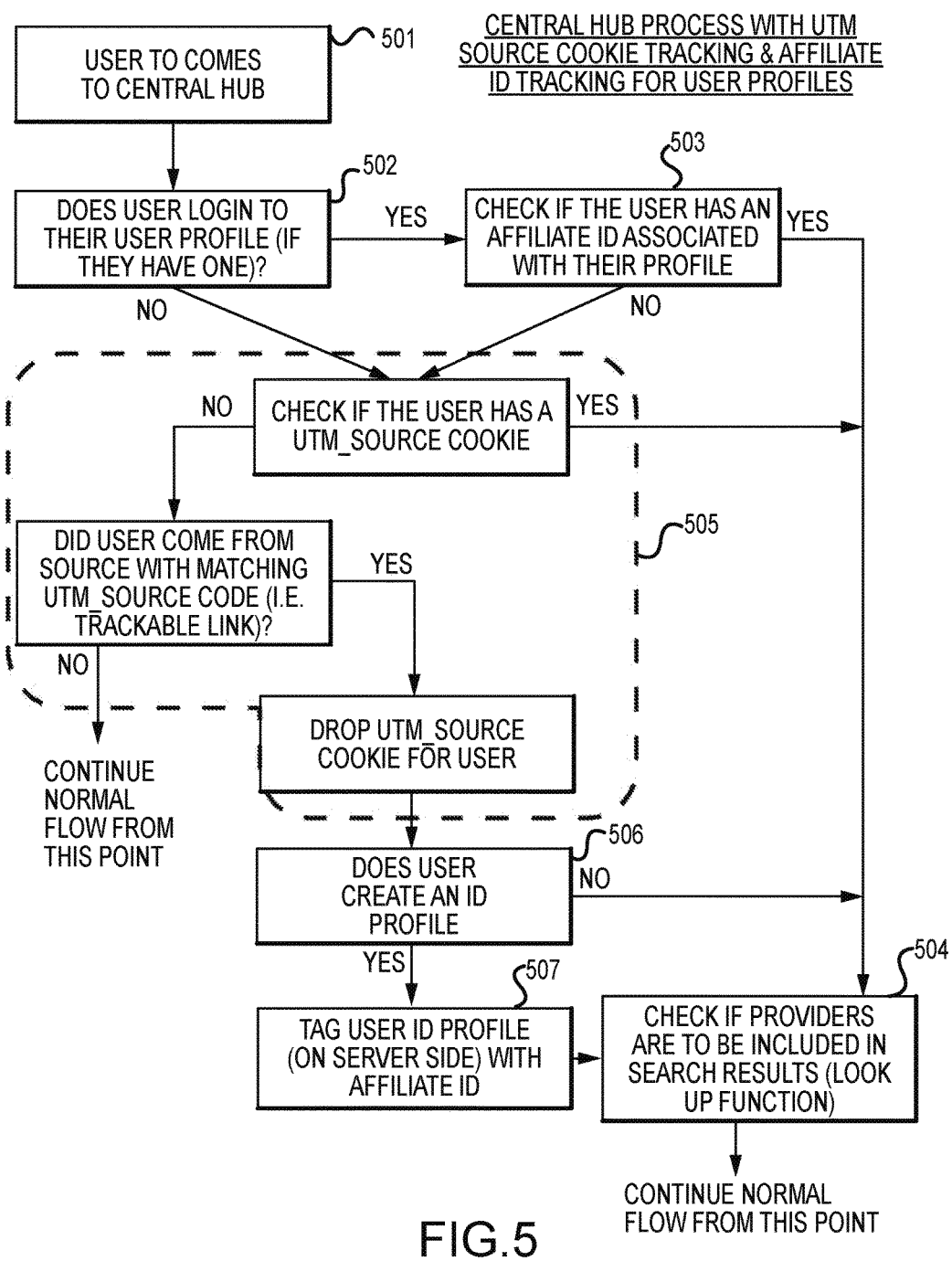
FIG. 5 is a flowchart for using cookies and assigning an affiliate ID to a user ID.

FIG. 5 shows an embodiment of using cookies and assigning an affiliate ID to a user's user ID. Information associating a user ID with an affiliate ID may be stored in a database (e.g., database 104) and accessible by central hub system 102. In step 501, a user comes to a central hub system 102. In step 502, the system determines whether a user login is associated with the user's profile. If so, then at step 503 it is determined whether the user has an affiliate ID associated with the user's profile. If so, then at step 504 the system checks whether providers are to be included in the search results, for example, using a look-up function. If so, then the system continues with the normal flow, as described with reference to FIG. 4. If at step 502 the system determines that the user does not have a login associated with their profile, or at step 503 the system determines that the user does not have an affiliate ID associated with their profile, then at step 505 the system checks to see if the user has a UTM_Source cookie. If not, then the system determines whether the user came from a source with a matching UTM_Source code. If not, then the system continues with the normal flow. If yes, then the system drops a UTM_Source cookie for the user at step 505 and determines whether the user creates an ID profile at step 506. At step 507 the system tags the user ID profile on the server side with an affiliate ID, and then moves to step 504.

As described above, the central hub system 102 provides a list of providers to the user (e.g., so the user can select a money transfer provider with which to transact). The list may be provided to the user via hyperlinks on the central hub site. The hyperlinks may be associated with uniform resource identifier (URI) (e.g., uniform resource locators ("url")) each of which direct the user to a provider of the plurality of providers If the user has a cookie associating the user with a referral source 106, then in step 406 the central hub system 102 will cause the url for each of the listed providers to contain an affiliate code that associates the user to the referral source. That is, the central hub system 102 will modify the url for the provider so that it links the user to the referral source. That way, when the user device 110 interacts with the provider system 108, the provider system 108 can determine that the user device 110 was directed to the central hub system 102 by a referral partner system 106. In some embodiments, the central hub system 102 modifies the url by adding an affiliate code to the url, which identifies the referral source.

Figure 6:
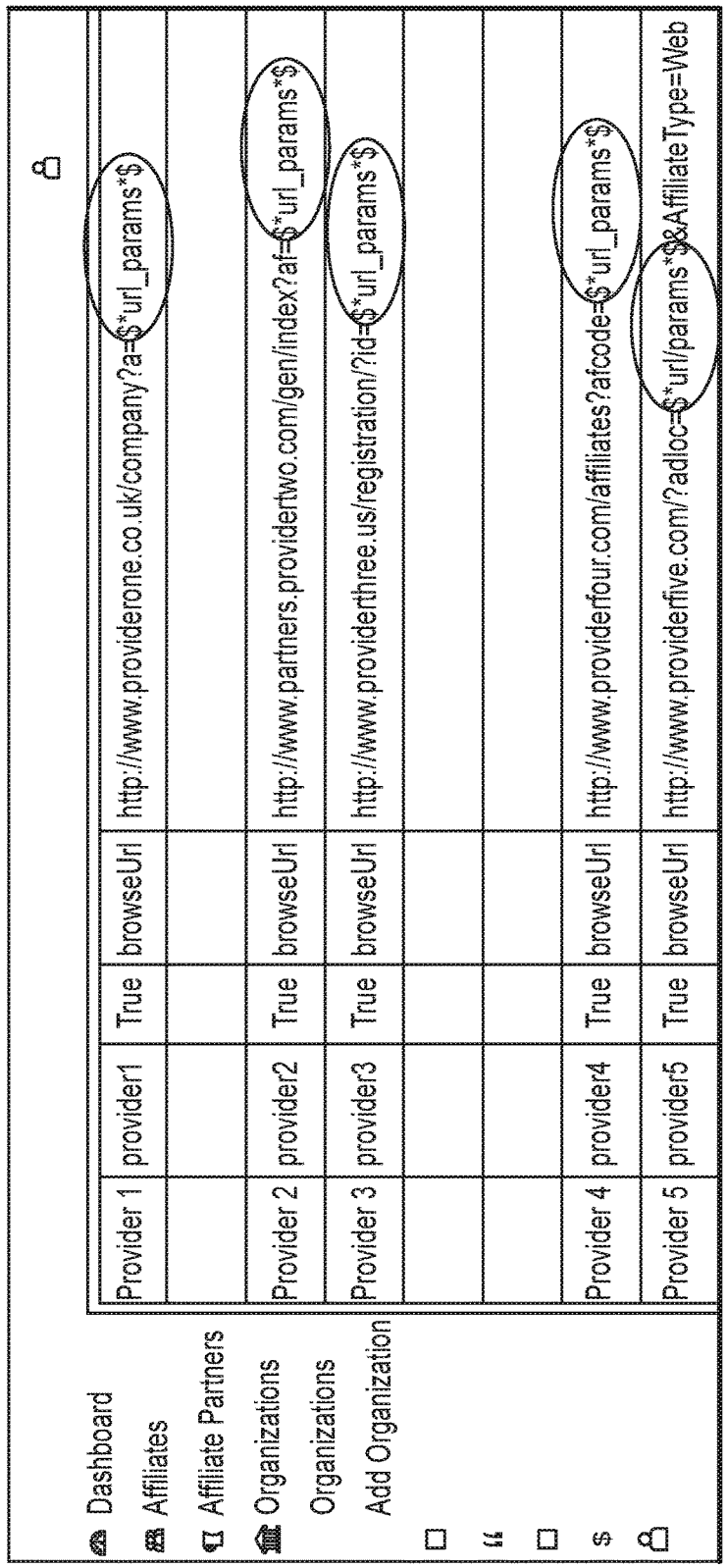
FIG. 6 is a table for determining how to modify the url to make the affiliate code compatible with the provider system.

FIG. 6 is a schematic representation of a screenshot presentable to a user of the central hub system 102 that has a table for determining how to modify the url to make the affiliate code compatible with the provider system. Referring to FIG. 6, in modifying the url, the central hub system 102 ensures that a url containing the affiliate code is compatible with the particular provider's system 108. In some embodiments, the central hub system 102 retrieves information from one or more databases and uses look-up tables to determine how to modify a url according to the provider's system. For example, the central hub system 102 uses look-up tables to establish where in the url the affiliate code should be inserted. In some embodiments, when the central hub system 102 determines a list of providers, it establishes a url for each provider. Each url has a pointer. When the central hub system 102 is determining how to modify the url, it reads the url and identifies the pointer, which indicates how to modify the url to make the affiliate code compatible with the provider system 108. Some examples of the way in which the affiliate codes may be formatted are: replace codes (number at the end of url), replace codes (number in the middle of url), change utm_campaign parameters, replace codes (text at the end of url), add utm_source parameter). The central hub system 102 can use look-up tables to determine a way in which to insert an affiliate code and modify the url. The look-up tables can include various providers and rules for modifying the urls, as well as affiliate codes for the reference sources. Thus, in the look-up tables, a particular referral source may be associated with a plurality of affiliate codes for the various provider systems. The central hub system 102 may be configured to retrieve, from a database 104, information from the look-up tables to determine how to process a url to appropriately insert an affiliate code. Thus, the central hub system 102 may be configured to modify urls in different ways to make them compatible with various provider systems.

FIG. 6 shows an exemplary pointer of $*url_params*$ but those in the art will appreciate that the pointer may contain any number and type of characters while remaining within the scope of this disclosure. The pointer may be located at various places within the url. For example, FIG. 6 show urls for providers 1-4, which require the affiliate code to be at the end of the url (since the pointer $*url_params*$ is located at the end of the url). The url associated with provider 5 requires the affiliate code to be at a particular place within the url (since the pointer $*url_params*$ is within the url). Other provider systems can require the affiliate code to be in a different location of the url, and so the pointer would thus be in such location.

FIG. 7 shows an exemplary look-up table for affiliate codes linking a referral source to a url that leads to a provider. The look-up table can be presented to a user of the central hub system 102. FIG. 8 shows an exemplary user interface for modifying the table of FIG. 7, for example, for manipulating the look-up table. In other embodiments, the look-up table can be populated automatically.

Turning back to FIG. 4, in step 408, the user selects a hyperlink on the central hub system's webpage, which causes the modified url to direct the user system 110 to a provider system 108. When the modified url is received by the provider system 108, the processor 202 of the provider system 108 reads the modified url and identifies the affiliate code. Based on this identification, the central hub system 108 stores information about the user's 110 transactions on the provider's site, and this information is stored along with data associating the referral source and the central hub with the user and these transactions. For example, information about the user's transactions with the provider systems 108 could be stored with data tags, which associate the user's transaction information with the referral source and the central hub. The information and associating data could be stored in a local memory 210 associated with the provider system 108 and/or in a remote database (e.g., cloud database).

The user's transaction information and the associating data can be communicated to the central hub and/or to the referral source, where it can be stored in a memory. As such, the central hub and the referral source can determine how much money the provider collects from user and/or how much money the central hub collects from the provider. As such, the central hub and the referral source may engage in a cost sharing agreement.

Referring to FIG. 1, in some embodiments, the cost share may be automatically determined by the central hub system 102. The central hub system 102 may communicate with a bank system 112 that causes money to be transferred among the provider, central hub, and/or referral source in order to effectuate the cost sharing agreement.

Returning to FIG. 4, in step 402, if the central hub system determines the user does not have a source cookie, the central hub system will step 414 determine whether the user came onto the website hosted by the central hub system via a referral source (e.g., via a link that tracks back to the referral source). If so, then the central hub system 102 will cause a source cookie to be dropped, so that the user device 110 is associated with the referral source for a predetermined amount of time (e.g., so that next time the user comes onto the central hub's website, the method will move from step 402 to step 404).

If in step 414 the central hub server determines that the user did not come from a referral source, then the central hub system 102 drops a cookie on the user that associates the user with the central hub but not with any referral sources. Thus, when the user pays providers for services, the providers can pay the central hub, but the central hub won't be obligated to pay a referral source since the user's transaction will be outside of the cost sharing agreement.

As described in FIG. 4 (e.g., step 406), the affiliate code for a provider may be rendered as a url on a webpage, and/or may be rendered in an email or a text message sent to the user. For example, the central hub system 102 may cause an email and/or text message to be sent to a user device, and the email and/or text message may include a hyperlink associated with the modified url. Thus, when the user selects the hyperlink in the email and/or text, the user is directed to the provider system 108 via the modified url.

FIGS. 7-9 are screenshots showing how a user of a central hub system can modify the modify a url. FIGS. 8 and 9 are schematic representations screenshots presented to a user of a central hub system for modifying the table of FIG. 7. FIG. 10 is a screenshot showing how a provider system can receive a lead to a user system 110 via an email from the central hub system 102 that associates the user with a referral source.

The disclosed system enables an operation to ascertain which users that are directed by the central hub to the provider are brought onto the central hub's site by a referral source, and which users that are directed by the central hub to the provider go onto the central hub's site without a referral source. As such, among various other benefits, the system herein described allows an entity operating the central hub and a referral source to have a cost-sharing agreement to promote user traffic to the providers.

In some circumstances, it would not be advantageous for a provider and a particular user to transact with one another. For example, a conflict of interest may exist between the provider and the user, or the user may speak a language different than that offered by the provider, etc. In cases in which a user is directed to a first provider's website, upon the first provider system 108 determining that the user is incompatible, the first provider system 108 becomes a referring provider and may refer the user to another provider system. In such case, both the referral source and the referring provider can get credit for the transactions the user conducts with the second provider. In order to keep track of both credit for the referring provider and the referral source, the central hub system 102 is configured to modify the URI by inserting an identifier that it reflects referrals by both the referral source and the first provider system. In some embodiments, the identifier represents both the referral source and the referring provider. In some embodiments, the identifier includes a first identifier portion that represents the referral source and a second identifier portion that represents the referring provider.

In some circumstances, a user from a different hub system comes to a provider and it is determined that it would not be advantageous for the provider and the particular user to transact with one another. The provider then directs the user to central hub system 102, which then directs the user to another provider system 108. In such cases, the provider that directed the user to the central hub system 102 can be treated as a referral source, as explained above.

Figure 11:
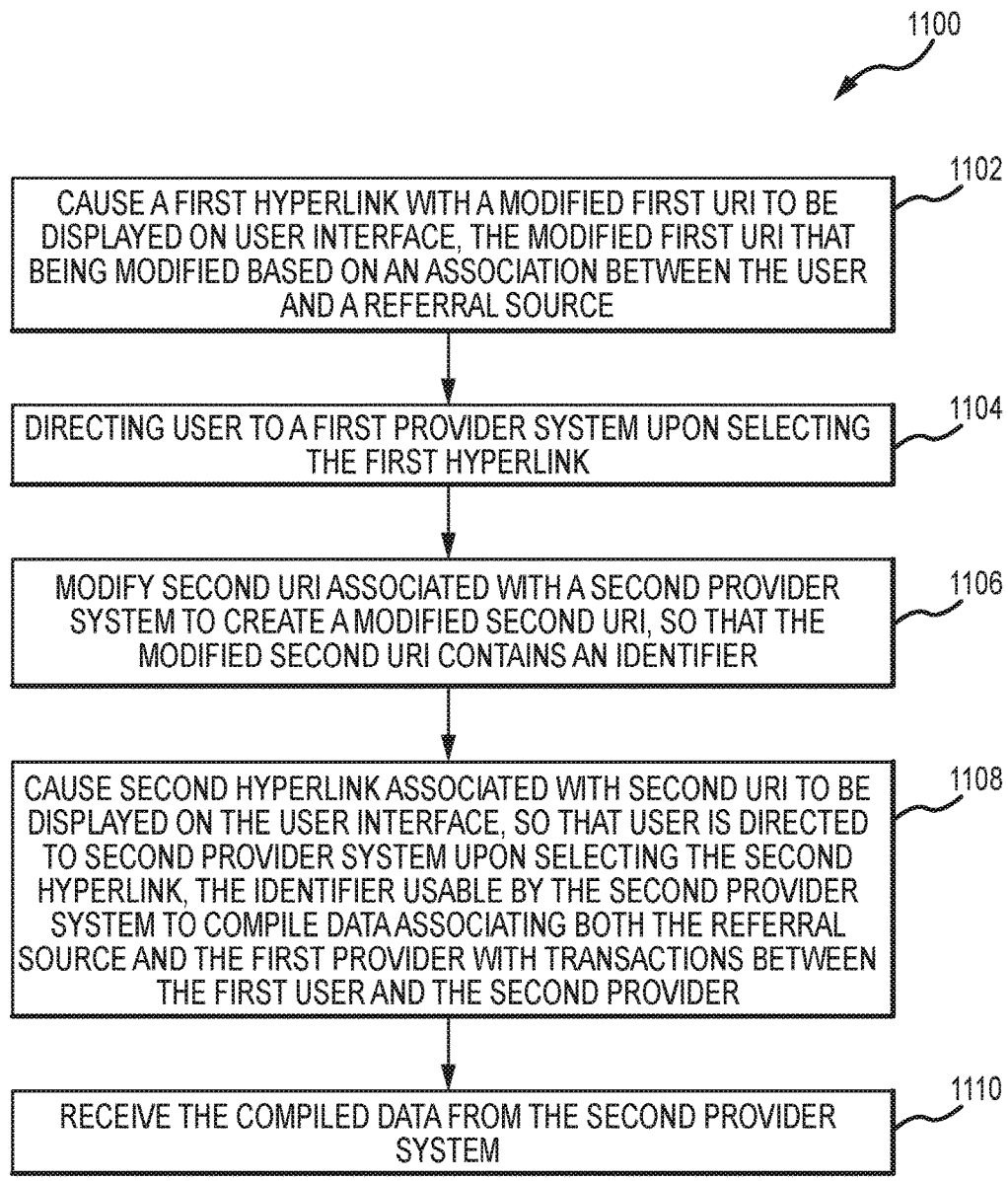
FIG. 11 is a flowchart for a method of tracking a referral source.

FIG. 11 shows an embodiment of a process 1100 for tracking both a referral source and a referring provider. The process can be carried out by a processor of the hub system 102. In step 1102, the processor causes a first hyperlink with a modified first URI to be displayed on a user interface. The modified first URI can be modified based on an association between the user and the referral source. In step 1104, upon the first user selecting the first hyperlink, the processor directs the user to a first provider system. In step 1106, the processor modifies a second URI associated with a second provider system to create a modified second URI, so that the modified second URI contains an identifier. In step 1108, the processor causes a second hyperlink associated with second URI to be displayed on the user interface. Upon selecting the second hyperlink, the user is directed to a second provider system. The identifier is usable by the second provider system to compile data associating both the referral source and the first provider with transactions between the first user and the second provider. In some embodiments, the central hub system receives compiled data from the second provider system, for example, to enable cost-sharing arrangements among the provider of the central hub, the referral source, and the first provider (e.g., referring provider). The identifier can specifically identify the referral source and referring provider. FIG. 12 shows an exemplary look-up table usable by the central hub system 102 for identifying identifiers that associate the referral source and the referring provider.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A hub system for tracking referral source internet traffic, the hub system comprising a processor and a memory, the memory containing computer readable instructions that, when executed by the processor, cause the processor to:

interact with a first user via a first user interface;
select a plurality of providers, including a first provider associated with a first uniform resource identifier (URI) and a second provider associated with a second URI;
based on determining that the first user has been referred to the hub system by a first referral source of a plurality of selected referral sources, modify the first and second URIs, wherein the modifying comprises:

modifying the first URI to create a modified first URI, so that the modified first URI contains a first identifier corresponding to the first referral source, and modifying the second URI to create a modified second URI, so that the modified second URI contains a second identifier corresponding to the first referral source; and cause a first hyperlink to be displayed on the first user interface, the first hyperlink being associated with the modified first URI so that the first user is directed to a first provider system associated with the first provider upon the first user selecting, via the first user interface, the first hyperlink that is associated with the modified first URI.

2. The hub system of claim 1, wherein the first and second uniform resource identifiers are uniform resource locators (URLs).

3. The hub system of claim 1, wherein the computer readable instructions cause the processor to select the plurality of providers based on an attribute associated with the first user.

4. The hub system of claim 3, wherein the attribute is a language.

5. The hub system of claim 1, wherein modifying the first and second URIs further comprises:
determining, based on the first URI, a first type of modification;
modifying the first URI according to the first type of modification to create the modified first URI;
determining, based on the second URI, a second type of modification; and
modifying the second URI according to the second type of modification to create the modified second URI, wherein the first type of modification is different than the second type of modification.

6. The hub system of claim 5, wherein the computer readable instructions cause the processor to read the first URI to locate a pointer; and determine the first type of modification for the first URI based on the location of the pointer within the first URI.

7. The hub system of claim 5, wherein, upon the first user being directed to the first provider system, the computer readable instructions further cause the processor to:
modify the modified second URI that is associated with the second provider according to another type of modification to create another modified second URI, so that the another modified second URI contains another identifier associated with the first provider; and
cause a second hyperlink to be displayed on the first user interface, the second hyperlink being associated with the another modified second URI so that the first user is directed to a second provider system associated with the second provider upon the first user selecting the another modified second URI;
wherein the another identifier is usable by the second provider system to compile user data associating both the first referral source and the first provider with transactions between the first user and the second provider.

8. The system of claim 7, wherein the instructions cause the processor to perform the steps of claim 7, upon the hub system receiving an indication from the first provider that the first provider will not transact with the first user.

9. The system of claim 8, wherein upon the hub system receiving the indication from the first provider, the instructions further cause the processor to select another plurality of providers that excludes the first provider, and which includes the second provider associated with the second URI.

10. A system, comprising:
the hub system of claim 1, wherein the hub system is configured to cause a second hyperlink to be displayed on the at least one first user interface, the second hyperlink being associated with the modified second URI so that the first user is directed to a system associated with the second provider upon the first user selecting the modified second link containing the second identifier; and
the plurality of providers of claim 1, wherein:
the first provider system is configured to use the first identifier to compile user data associating the first referral source with transactions between the first user and the first provider, and
the second provider system is configured to use the second identifier to compile user data associating the first referral source with transactions between the first user and the second provider.

11. The referral tracking system of claim 10, wherein the hub system is further configured to present information for display corresponding to the user data.

12. The hub system of claim 10, wherein the hub system is configured to receive from the first and second provider systems the user data associating the first source with the transactions between the first user and the first and second providers, respectively.

13. The hub system of claim 1, wherein:
the first referral source provides the first user with a trackable link that indicates the first user was referred to the hub system by the first referral source, and
the computer readable instructions cause the processor of the hub system to associate the first user with the first referral source.

14. The hub system of claim 1, wherein the computer readable instructions cause the processor to display information to the first user on the first user interface providing the first user with a comparison between the plurality of providers, wherein the first hyperlink allows the first user to engage in transactions with the first provider.

15. The hub system of claim 1, wherein the computer readable instructions further cause the processor to host a website that includes the first user interface.

16. A method for tracking internet traffic referral sources, comprising:
interacting with a first user via a first user interface;
selecting a plurality of providers, including a first provider associated with a first uniform resource identifier (URI) and a second provider associated with a second URI;
based on determining that the first user has been referred to the hub system by a first referral source of a plurality of selected referral sources, modifying the first and second URIs, wherein the modifying comprises:
modifying the first URI a to create a modified first URI, so that the modified first URI contains a first identifier corresponding to the first referral source, and
modifying the second URI to create a modified second URI, so that the modified second URI contains a second identifier corresponding to the first referral source; and
causing a first hyperlink to be displayed on the first user interface, the first hyperlink being associated with the modified first URI so that the first user is directed to a first provider system upon the first user selecting, via the first user interface, the first hyperlink that is associated with the modified first URI.

17. The method of claim 16, wherein the first and second uniform resource identifiers are uniform resource locators (URLs).

18. The method of claim 16, wherein the selecting the plurality of providers is based on an attribute associated with the first user.

19. The method of claim 18, wherein the attribute is a language.

20. The method of claim 16, further comprising:
receiving, from the first provider system, first user data compiled by the first provider system using the first identifier, the first user data associating the first referral source with transactions between the first user and the first provider;
receiving, from the second provider system, second user data compiled by the second provider system using the second identifier, the second user data associating the first referral source with transactions between the first user and the second provider; and
presenting for display information corresponding to the first and second user data.

21. The method of claim 16, wherein modifying the first and second URIs further comprises:
determining, based on the first URI, a first type of modification;
modifying the first URI according to the first type of modification to create the modified first URI;
determining, based on the second URI, a second type of modification; and
modifying the second URI according to the second type of modification to create the modified second URI, wherein the first type of modification is different than the second type of modification.

22. The method of claim 21, further comprising:
reading the first URI to locate a pointer; and
determining the first type of modification for the first URI based on the location of the pointer within the first URI.

23. The method of claim 21, further comprising:
receiving data from the first provider system indicating that the first provider system will not transact with the first user;
based on the received data, selecting another plurality of providers that excludes the first provider, and which includes the second provider associated with the second URI;
modifying the modified second URI according to another type of modification to create another modified second URI, so that the another modified second URI contains another identifier associated with the first provider; and
causing a second hyperlink to be displayed on the first user interface, the second hyperlink being associated with the another modified second URI so that the first user is directed to a second provider system associated with the second provider upon the first user selecting the another modified second URI;
wherein the another identifier is usable by the second provider system to compile user data associating both the first referral source and the first provider with transactions between the first user and the second provider.

24. A hub system for tracking referral source internet traffic, the hub system comprising a processor and a memory, the memory containing computer readable instructions that, when executed by the processor, cause the processor to:
host a website;
interact with a first user via the website;
select a plurality of providers, including a first provider associated with a first uniform resource identifier (URI) and a second provider associated with a second URI;
based on determining that the first user has been referred to the hub system by a first referral source of a plurality of selected referral sources, modify the first and second URIs, wherein the modifying comprises:
modifying the first URI to create a modified first URI, so that the modified first URI contains a first identifier corresponding to the first referral source, and
modifying the second URI to create a modified second URI, so that the modified second URI contains a second identifier corresponding to the first referral source; and
cause a first hyperlink to be displayed on at least one first user interface, the first hyperlink being associated with the modified first URI so that the first user is directed to a first provider system associated with the first provider upon the first user selecting the first hyperlink that is associated with the modified first URI.

* * * * *